United States Patent
Lenning

[15] 3,699,720
[45] Oct. 24, 1972

[54] ADAPTIVE CONTROL FOR A GRINDING MACHINE

[72] Inventor: Ronald L. Lenning, Wilmington, Ohio

[73] Assignee: Cincinnati Milacron Inc., Cincinnati, Ohio

[22] Filed: April 26, 1971

[21] Appl. No.: 137,286

[52] U.S. Cl............................51/165.77, 51/165.91
[51] Int. Cl. .............................................B24b 49/04
[58] Field of Search.........51/165.77, 165.91, 165.93, 51/165

[56] References Cited

UNITED STATES PATENTS

| | | | |
|---|---|---|---|
| 3,456,394 | 7/1969 | Welsh | 51/165.77 |
| 2,537,389 | 1/1951 | Alt | 51/165.91 |
| 3,197,921 | 8/1965 | Hohler | 51/165.93 |

Primary Examiner—Harold D. Whitehead
Attorney—Howard T. Keiser and C. Richard Eby

[57] ABSTRACT

An apparatus for use on a grinding machine for adaptively controlling the grinding process. The grinding process is initiated by a coarse-feed motion of a grinding tool into a workpiece. A gaging device is adapted to the workpiece and produces a gaging signal representing the excess material remaining thereon. A feed back circuit produces a control signal as a function of the power required by the grinding process, and the control signal represents an amount of material capable of being removed from the workpiece by the measured power. A comparator circuit is responsive to the gaging signal and the control signal and produces an output signal when the excess material remaining on the workpiece equals the amount of material capable of being removed by the measured power. The output signal is operative to terminate the coarse feed, and the remaining material is removed primarily as the result of the force which has built up between the tool and the workpiece as indicated by the measured power. When the gaging signal indicates the part is ground to size, the tool is retracted from the workpiece.

7 Claims, 2 Drawing Figures

ADAPTIVE CONTROL FOR A GRINDING MACHINE

BACKGROUND OF THE INVENTION

The invention relates generally to the automatic control of the grinding process, and specifically the invention provides a control for generating an optimum grinding cycle for producing more consistently finished workpieces.

The prior art contains many examples of controls responsive to the grinding pressure between a grinding tool and a workpiece for controlling particular portions of a grinding cycle. For example, there are controls providing a gap elimination for controlling the rapid infeed before the tool contacts the workpiece. There are controls responsive to excessive grinding forces during a fine feed cycle for initiating a corrective action. In addition, there are many devices shown for obtaining signals representing the grinding force. All the prior art systems are singular in purpose, that being to minimize the time required by a grinding cycle. Most of the prior art devices do not have any positive control over the final surface finish and roundness of the workpiece. In all the devices, after the time saving cycles have been executed, the workpiece is machined to final size by means which have a minimum of control over the desired final parameters. For example, in some systems, the fine feed and dwell are controlled by a gaging apparatus operating completely independent of the existing grinding force. In other systems, the fine feed and dwell are for predetermined fixed times. In still other systems, the tool feeds in to a positive stop, and the dwell is controlled by a predetermined timing cycle. The latter two systems operate completely independent of the actual final workpiece parameters.

Applicant proposes an apparatus that not only further optimizes the grinding cycle but also improves the control over the actual final surface finish and roundness. Final surface finish and roundness can be controlled by controlling the magnitude of the final grinding force when the final size is reached. The prior art systems completely ignore this parameter. When detecting a final size, the final grinding force may be anywhere from almost zero to some substantial value; and likewise, the surface finish and roundness can vary over a substantial range. Consequently, by selecting a final grinding force, the disclosed apparatus permits one to predetermine and control the final finish and roundness. The final force can be represented by a final power being consumed by the grinding process. At any time during the grinding process, the power being consumed can be measured. This power is an approximate representation of the actual grinding force; therefore, the difference between the actual power and the final power represents a particular grinding force magnitude or spring out. Spring out is defined by the deflection of the workpiece relative to the grinding tool and is a function of the elasticity of the entire machine. If the grinding feed is terminated, the grinding forces which have built up will operate to relieve the spring out of the workpiece; and a certain amount of material will be removed. Therefore, the difference between the actual power and the final power represents a change in workpiece size which would occur with no further coarse feed.

Given a grinding gage device to measure the workpiece and produce a gaging signal representing an excess of material on the workpiece over a predetermined final workpiece size. Given further, a control signal produced as a function of the power being consumed by the grinding process and representing an amount of material said power is capable of removing from the workpiece. When the excess material on the workpiece equals the material capable of being removed by the existing grinding force, the coarse feed is stopped; and a dwell cycle may be initiated. The grinding force will remove the remaining material, and the final size will be obtained simultaneously with a final power or grinding force. Therefore, the final size, final surface finish and roundness will be consistent from workpiece to workpiece.

Applicant's apparatus substantially eliminates the necessity for a fine grinding feed thus providing a substantial savings in the grinding cycle time. When the tool is brought into contact with the workpiece, the coarse grinding feed is initiated until the power being consumed is able to remove the material remaining on workpiece. This defines a switching point where, in the preferred embodiment, a dwell cycle is initiated. It should be noted that the dwell cycle varies for each workpiece because the switching point is a function of the excess material on the workpiece, the condition of the grinding wheel, and other variables in the grinding process. The switching point is adaptively controlled to produce a final size at a final grinding force, thereby providing a consistent final surface finish and roundness.

SUMMARY OF THE INVENTION

The invention provides an apparatus for controlling a grinding process. The grinding process is executed by a grinding machine having a driving mechanism for producing relative motion and consequently a grinding force between a workpiece and a rotating grinding tool. The grinding tool is driven by a motor which is responsive to a source of power. The grinding machine contains a gaging device which produces a gaging signal representing the excess material remaining on the workpiece. A power feed back circuit generates a control signal representing the amount of material the existing power is capable of removing. A comparator circuit has inputs responsive to the gaging signal and the control signal and produces an output signal in response to a predetermined relationship between the input signals. A driving mechanism control is responsive to the output signal for modifying the operation of the driving mechanism to decrease the grinding force. Further, the control initiates the driving mechanism to move the tool away from the workpiece in response to a predetermined magnitude of the gaging signal representing a final predetermined workpiece size. This size will occur simultaneously with a predetermined force being exerted on the workpiece.

DESCRIPTION OF THE PREFERRED EMBODIMENT

Figure 1:
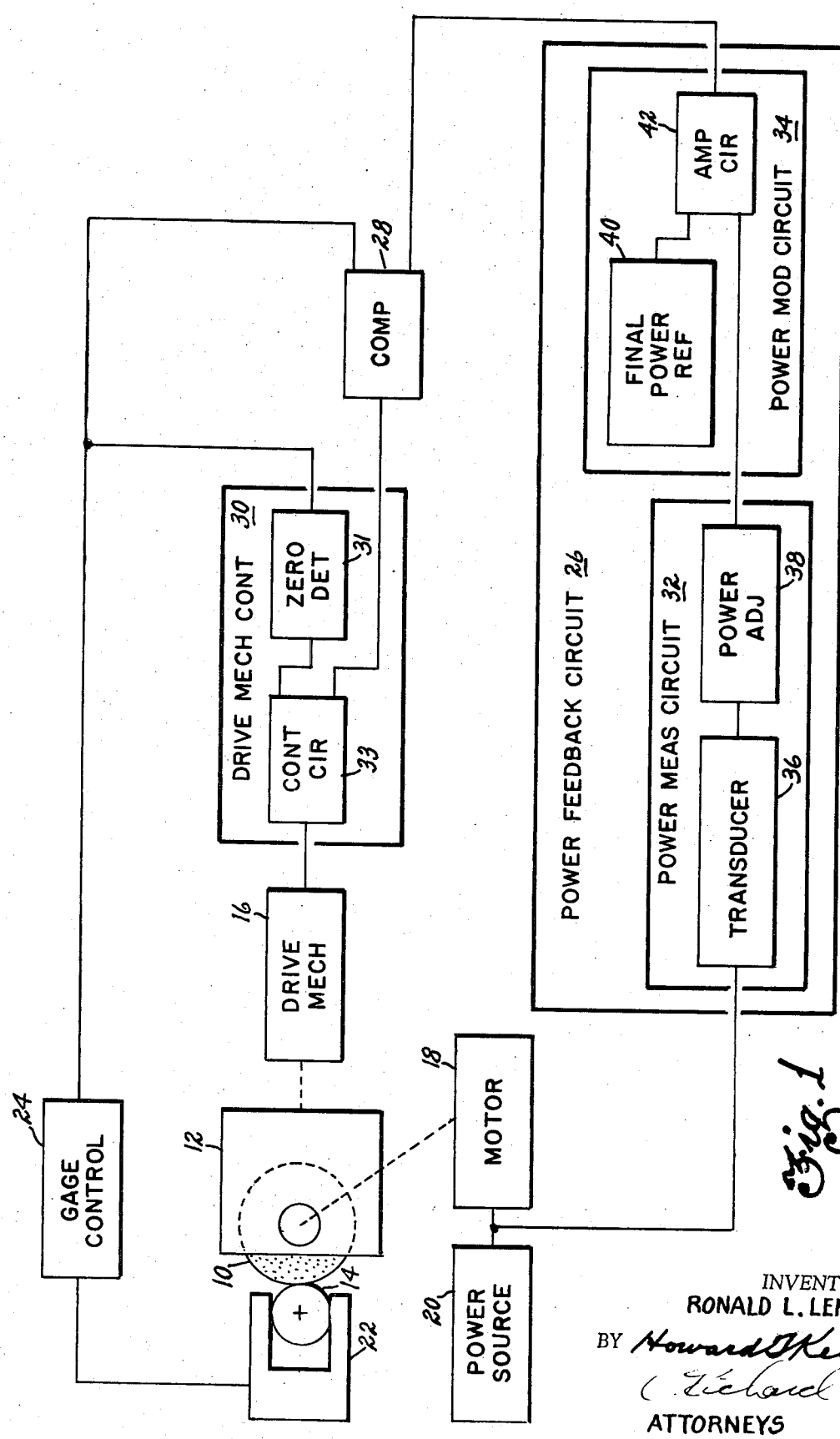
FIG. 1 is a block diagram of the preferred embodiment of the invention.

FIG. 1 is a block diagram of the preferred embodiment of the invention. An abrasive tool 10 is rotatably mounted in a structure 12. A workpiece 14 is rotatably mounted on a machine structure (not shown). The driving mechanism 16 is mechanically coupled to the structure 12 and is operative to provide a relative motion between the workpiece 14 and tool 10. Coupled to the tool 10 is a motor 18 which is energized by a power source 20. A gaging device comprised of a gage head 22 and a gage control 24 is adapted to the machine structure. The gage head 22 is in communication with the workpiece 14 and is sensitive to changes in the workpiece diameter. The gage control 24 is responsive to signals from the gage head and produces gaging signals which are compatible with the remaining elements comprising the invention. Gaging devices are well-known in the art, and any gage head and control is applicable which produces a gaging signal representing an excess of material on the workpiece over a predetermined workpiece size. The above elements are present in almost all grinding machines, and the exact nature of their form is not important. The disclosed invention is applicable to any type of grinding machine having a gaging apparatus. Further, the fact that the structure illustrated indicates a center-type grinding machine is not a limitation. Any type of grinding machine may be used with the disclosed invention.

The grinding process is initiated by the driving mechanism rapidly moving the tool 10 toward the workpiece 14. By means not shown but well-known to those who are skilled in the art, when the tool 10 contacts the workpiece 14, the feed rate of the tool 10 is reduced from a rapid value to a coarse feed value. During this time, a power feed back circuit 26 is responsive to the power supplied by the source 20 and produces a control signal as a function of the power required by the grinding process. A comparator circuit 28 has inputs responsive to the control signal and the gaging signal from the gaging device. When the input signals have a predetermined relationship to each other, e.g., when they are equal, the comparator circuit produces an output signal. A driving mechanism control 30 is responsive to the output signal for modifying the operation of the driving mechanism.

In the preferred embodiment, the driving mechanism control 30 is operative to the terminate the coarse feed and initiate a dwell cycle. As earlier described, the grinding process continues as a function of the grinding force existing between the tool and workpiece. In an alternative embodiment of the invention, a fine feed may be initiated instead of the dwell cycle. It is not necessary that the exact theory of the requirements for this situation be disclosed. It should be sufficient to state that the application may arise where a better control over final finish and roundness and a more efficient cycle is achieved by using a fine feed to complete the grinding cycle. The heart of the invention is that a switching point is used which will give a final size at a predetermined final power thus providing a more consistent final surface finish and roundness.

The driving mechanism control 30 contains a zero detector 31 which is responsive to a zero value of the gaging signal. A control circuit 33 is responsive to an output from the zero detector 31 to modify the operation of the driving mechanism and move the tool 10 away from the workpiece 14. There are many types of driving mechanisms and driving mechanism controls available and shown in the prior art. The interface of the disclosed invention into any standard driving mechanism and control can be readily accomplished by one who is skilled in the art.

The power feedback circuit 26 is comprised of a power measuring circuit 32 and power modification circuit 34. The power measuring circuit 32 contains a transducer circuit 36 and power adjustment circuit 38. The transducer circuit 36 is responsive to the power supplied by the source 20 for producing a first signal as a function thereof. The power adjustment circuit 38 is responsive to the first signal for producing a power signal representing the power required exclusively by the grinding process. In other words, the power required to drive the tool in an unloaded or idle condition is eliminated from the first signal to produce the power signal. Within the power modification circuit 34, a final power reference circuit 40 produces a reference signal representing the final power desired when the workpiece reaches a final size. The final surface finish and roundness, which are a function of the final grinding force, are also represented by the reference signal defining the final power. An amplifier circuit 42 is responsive to the reference signal and the power signal for producing a control signal. The control signal represents an amount of material capable of being removed from the workpiece as a function of the power required by the grinding process and the final power.

Figure 2:
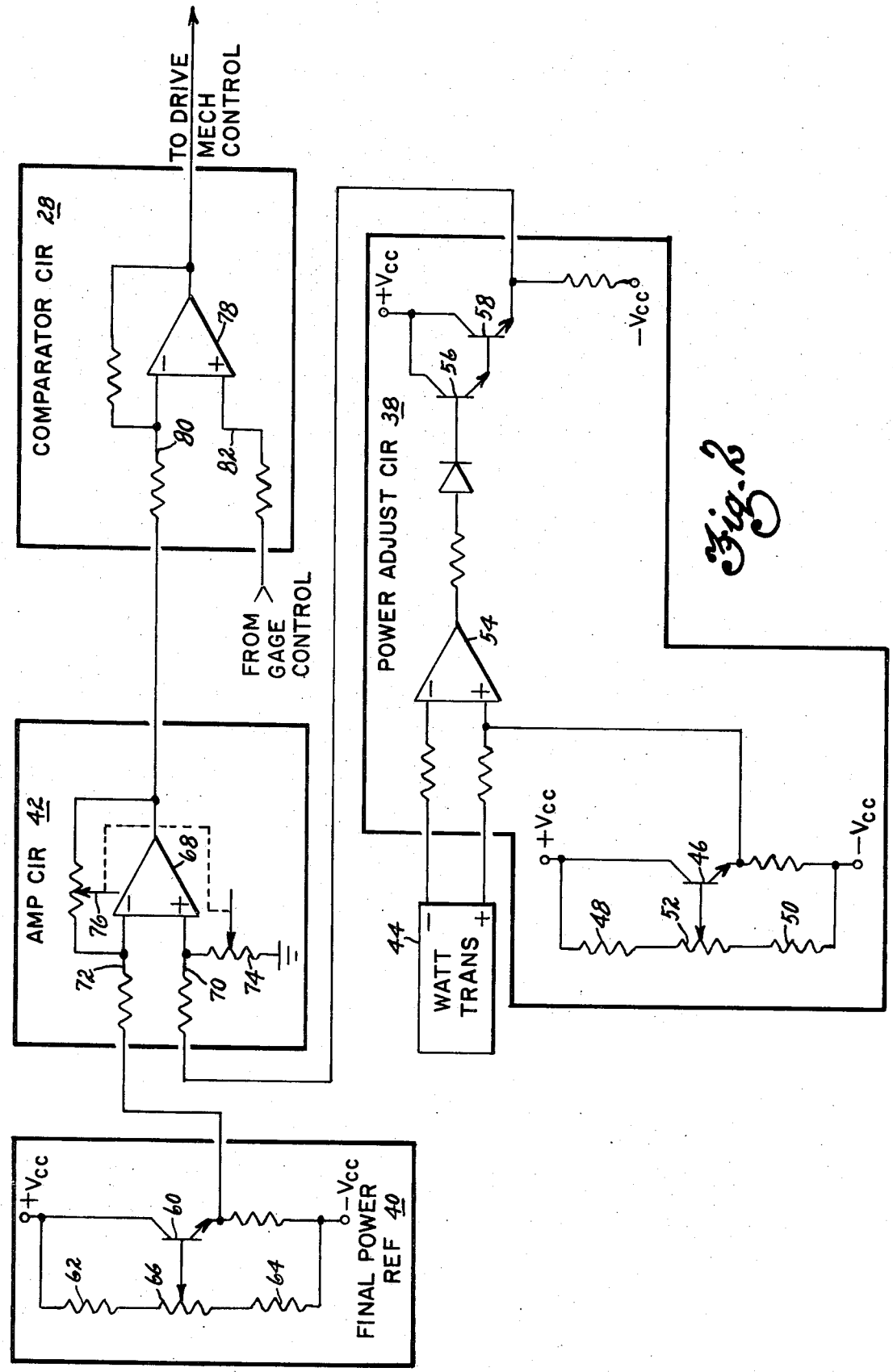
FIG. 2 is a detailed schematic diagram of the power feed-back circuit and comparator circuit shown in FIG. 1.

FIG. 2 is a detailed schematic diagram of the power feed back circuit 26 and comparator circuit 28 shown in FIG. 1. There are many power transducer circuits commercially available. Applicant has chosen to use a watt transducer which produces a current signal as a function of the power consumed by the grinding tool. Within the power adjustment circuit 38, a transistor 46 has a variable base biasing network comprised of resistors 48 and 50 and potentiometer 52. The emitter of transistor 46 is connected as an input to a differential amplifier 54. The inputs of the amplifier 54 are also connected to the watt transducer 44. When the tool is in an unloaded or idling condition, the potentiometer 52 can be adjusted to produce a zero signal on the output of the amplifier 54. Consequently, the output of amplifier 54 represents only the power consumed by the grinding process. The output of amplifier 54 is connected to the base of transistor 56 which is connected with transistor 58 in a Darlington configuration. Transistors 56 and 58 provide a current amplification to produce a power signal from the power adjustment circuit 38 representing the power consumed by the grinding process.

The final power reference circuit 40 is comprised of a transistor 60 having a variable base biasing circuit comprised of resistors 62 and 64 and potentiometer 66. The potentiometer 66 is used to establish a reference current signal representing a predetermined final power from the emitter of transistor 60. The potentiometer 66 is calibrated and is set by the operator according to a value defined by a predetermined final power. A particular surface finish and degree of roundness is primarily a function of a final spring out or final power. A chart is supplied the operator for selecting a particular potentiometer setting which corresponds to a desired workpiece finish and roundness according to the tool and workpiece material being used. Of course, the adjustment can be made experimentally by grinding a workpiece and adjusting the potentiometer until the desired surface finish and roundness are realized.

The amplifier circuit 42 is comprised of a differential amplifier 68 having inputs 70 and 72 connected to the emitters of transistors 58 and 60 respectively. The amplifier 68 is operative to reduce the magnitude of the power signal on the input 70 by the magnitude of the reference signal on the input 72. The amplifier 68 also provides means for adjusting the gain of the power feed back circuit. This is provided by potentiometers 74 and 76 which are ganged together to operate as a single control. With the gain properly adjusted, the amplifier 68 produces a control signal representing amount of material that may be removed from the workpiece considering the present power being consumed by the grinding process and the fact that a predetermined final power is desired.

The comparator circuit 28 is comprised of a differential amplifier 78 having inputs 80 and 82 connected respectively to the amplifier 68 and the gage control 24 (shown in FIG. 1). When the difference between the control signal and the gaging signal is zero, the amplifier 78 produces an output signal to the driving mechanism control 30 (shown in FIG. 1). The output signal represents the condition where the excess remaining on the workpiece is equal to the material capable of being removed by the power required by the grinding process minus the predetermined final power. The output signal from the comparator is operative to modify the operation of the driving mechanism in the manner earlier described.

While the invention has been illustrated in some detail according to the preferred embodiments shown in the accompanying drawings, and while the preferred illustrated embodiments have been described in some detail, there is no intention to thus limit the invention to such detail. On the contrary, it is intended to cover all modifications, alterations and equivalents falling within the spirit and scope of the appended claims.

What is claimed is:

1. An apparatus for controlling a grinding process, said process being executed by a machine having a driving mechanism for producing relative motion and consequently a grinding force between a workpiece and rotating abrasive tool being driven by a power source, and said machine including a gaging device for generating a gaging signal representing an excess of material on the workpiece over a predetermined workpiece size, the apparatus comprising:
   a. means responsive to the power source for generating a control signal as a function of power being consumed by the grinding process;
   b. means for receiving and comparing the control signal and the gaging signal to produce an output signal; and
   c. means responsive to the output signal and having an output connected to the driving mechanism for modifying the operation of the driving mechanism to reduce the grinding force.

2. An apparatus for controlling a grinding process, said process being executed by a machine having a driving mechanism for producing relative motion and consequently a grinding force between a workpiece and a rotating abrasive tool being driven by a power source and said machine including a gaging device for generating a gaging signal representing an excess of material on the workpiece over a predetermined workpiece size, the apparatus comprising:
   a. means responsive to the power source for producing a power signal as a function of power being consumed by the grinding process;
   b. means responsive to the power signal for changing said power signal to produce a control signal representing an amount of material that may be removed from the workpiece as a function of the power being consumed;
   c. means for receiving and comparing the control signal and the gaging signal and producing an output signal in response to said signals having substantially equal magnitudes; and
   d. means responsive to the output signal and having an output connected to the driving mechanism for modifying the operation of the driving mechanism to reduce the grinding force in response to the output signal.

3. The apparatus of claim 2 wherein the means for producing the power signal further comprises:
   a. means responsive to the power source for producing a first signal representing total power being supplied by the power source; and
   b. means responsive to the first signal for generating the power signal by reducing the first signal an amount representing the power required to drive the tool in an unloaded condition.

4. The apparatus of claim 3, wherein the means for producing the control signal further comprises:
   a. means for producing a reference signal representing a predetermined final power upon the workpiece being reduced to the predetermined size; and
   b. means responsive to the power signal and the reference signal for producing the control signal, said control signal representing an amount of material that may be removed from the workpiece as a function of the power being consumed by the grinding process minus the predetermined final power.

5. The apparatus of claim 4 wherein the modifying means is operative to terminate the operation of the driving mechanism in response to the output signal.

6. The apparatus of claim 4 wherein the modifying means is operative to substantially reduce the relative motion between the tool and workpiece in response to the output signal.

7. An apparatus for controlling a grinding process, said process being executed by a machine having a driving mechanism for producing relative motion and consequently a grinding force between a workpiece and a rotating abrasive tool being driven by a power source, and said machine including a gaging device for generating a gaging signal representing an excess of material on the workpiece over a predetermined workpiece size, the apparatus comprising:
   a. a transducer circuit connected to the power source and producing a first signal representing total power being supplied by said source;

b. a first reference circuit for providing a first reference signal representing power being consumed by the rotating tool in an unloaded condition;
c. a first differential amplifier having inputs connected to the first reference circuit and the transducer circuit for producing a power signal as a function of the difference between the inputs;
d. a second reference circuit for providing a second reference signal representing a predetermined final power of the grinding process;
e. a second differential amplifier having inputs connected to the first differential amplifier and the second reference circuit for producing a control signal as a function of the difference between the inputs, said second differential amplifier including a gain adjustment for changing the magnitude of the control signal;
f. a third differential amplifier having inputs connected to the gaging device and the second differential amplifier for producing an output signal as a function of the difference between inputs; and
g. means responsive to the output signal and having an output connected to the driving mechanism for modifying the operation of the driving mechanism to reduce the grinding force in response to the output signal.

* * * * *